(12) United States Patent
Novak et al.

(10) Patent No.: US 6,237,903 B1
(45) Date of Patent: May 29, 2001

(54) SUSPENSION BUSHING APPARATUS

(75) Inventors: Stanley Jay Novak, Dearborn; Daniel F. Kmiec, Birmingham, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/266,967

(22) Filed: Mar. 12, 1999

(51) Int. Cl.$^7$ .................................. F16B 1/00; F16F 1/38
(52) U.S. Cl. ........................................ 267/141.3; 267/293
(58) Field of Search ............................ 267/141.2–141.5, 267/141.7, 153, 270, 279, 280, 292–194; 384/220, 222, 296, 297, 908; 403/224–226, 228

(56) References Cited

U.S. PATENT DOCUMENTS

| | | | |
|---|---|---|---|
| 1,827,233 | * 10/1931 | Hughes | 267/271 |
| 1,827,267 | * 10/1931 | Short | 267/271 |
| 4,139,246 | * 2/1979 | Mikoshiba et al. | 267/141.3 |
| 4,721,326 | 1/1988 | Massos et al. . | |
| 4,809,960 | 3/1989 | Kakimoto et al. . | |
| 5,058,867 | * 10/1991 | Hadano et al. | 267/141.3 |
| 5,439,203 | 8/1995 | Hadano . | |
| 5,595,452 | 1/1997 | Hill et al. . | |
| 5,820,115 | * 10/1998 | Stevenson et al. | 267/293 |

* cited by examiner

Primary Examiner—Chris Schwartz
(74) Attorney, Agent, or Firm—Gregory P. Brown

(57) ABSTRACT

A bushing apparatus for interconnecting two members and allowing relative motion therebetween allows decoupled spring rates in the axial and radial directions. The bushing apparatus includes an inner cylindrical member (14) having a first outer surface (20) and first and second ends (16, 18). First and second stops (22) which project radially outward from the first outer surface of the inner cylindrical member are positioned at the first and second ends, respectively. An outer cylindrical member (24) having a first inner surface (26) is arranged coaxially with the inner cylindrical member. A bearing member (28) having second inner and outer surfaces (29, 31) is interposed coaxially between the inner and outer cylindrical members. The second inner surface of the bearing member is cylindrical and slidable relative to the first outer surface of the inner cylindrical member. A first elastomeric member (36) having third and fourth ends (40, 42) and a third inner surface (32) is disposed coaxially with the inner cylindrical member. The third end of the first elastomeric member is adjacent to the first stop and the fourth end is adjacent to the bearing member. A second elastomeric member (38) having fifth and sixth ends (44, 46) and a fourth inner surface (34) is disposed coaxially with the inner cylindrical member. The fifth end of the second elastomeric member is adjacent to the second stop and the sixth end is adjacent to the bearing member. At least one of the first and second elastomeric members is unsecured to the bearing member.

17 Claims, 3 Drawing Sheets

SUSPENSION BUSHING APPARATUS

BACKGROUND OF THE INVENTION

1. Field of the Invention

This invention relates generally to bushing assemblies, and more particularly to bushing assemblies for retaining suspension control arms of motor vehicles.

2. Disclosure Information

Obtaining the optimal ride and handling characteristics of a motor vehicle often requires that suspension bushings have different radial and axial spring rates. Preferred handling characteristics often demand high radial spring rates. Conversely, noise, vibration, and harshness, NVH, and ride characteristics require low axial spring rates in the bushing. Typically, suspension bushings employ elastomers in which the radial and axial spring rates are coupled, therefore requiring a compromise in the selection between preferred handling characteristics and preferred NVH and ride characteristics. Attempts to overcome this compromise include the use of voided bushings, permitting varying degrees of stiffness by removing elastomeric material in specific areas of the bushing. While the voided bushing does allow for unique spring rates, it does not allow for complete decoupling of the axial and radial spring rates.

It would therefore be desirable to provide a bushing which is capable of having axial and radial spring rates that are decoupled, allowing more precise tuning for improved handling, NVH, and ride characteristics.

SUMMARY OF THE INVENTION

According to the present invention, a bushing apparatus has been discovered for interconnecting two members and allowing relative motion therebetween. The bushing apparatus includes an inner cylindrical member having a first outer surface and first and second ends. First and second stops which project radially outward from the first outer surface of the inner cylindrical member are positioned at the first and second ends, respectively. An outer cylindrical member having a first inner surface is arranged coaxially with the inner cylindrical member. A bearing member having second inner and outer surfaces is interposed coaxially between the inner and outer cylindrical members. The second inner surface of the bearing member is cylindrical and slidable relative to the first outer surface of the inner cylindrical member. A first elastomeric member having third and fourth ends and a third inner surface is disposed coaxially with the inner cylindrical member. The third end of the first elastomeric member is adjacent to the first stop and the fourth end is adjacent to the bearing member. A second elastomeric member having fifth and sixth ends and a fourth inner surface is disposed coaxially with the inner cylindrical member. The fifth end of the second elastomeric member is adjacent to the second stop and the sixth end is adjacent to the bearing member. At least one of the first and second elastomeric members is unsecured to the bearing member.

It is an advantage of the present invention to provide decoupled axial and radial spring rates to allow the inner cylindrical member to move against at least one elastomeric member without compressing or stretching at least one other elastomeric member.

DETAILED DESCRIPTION OF THE PREFERRED EMBODIMENT

Figure 1:
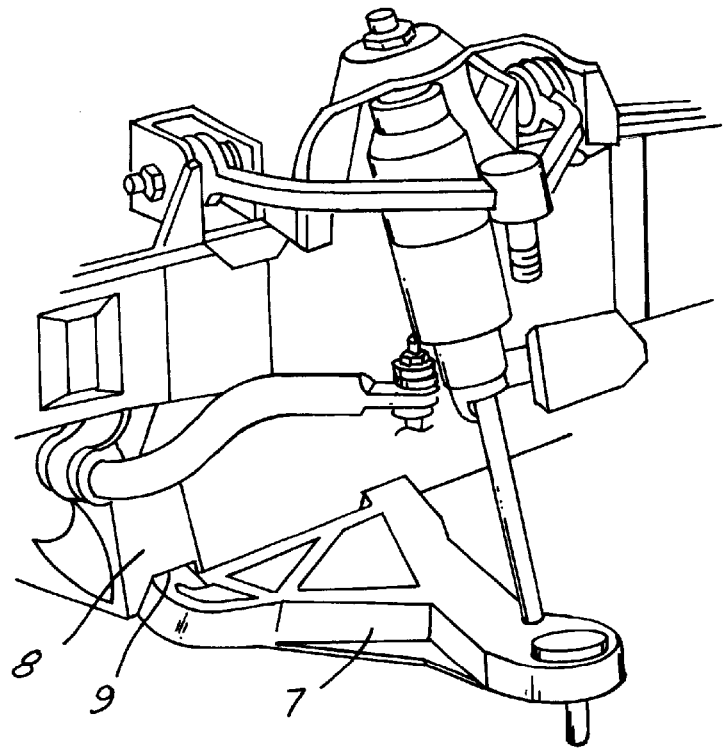
FIG. 1 is a partial perspective view of a typical motor vehicle suspension system including a bushing apparatus constructed in accordance with the present invention.
Figure 2:
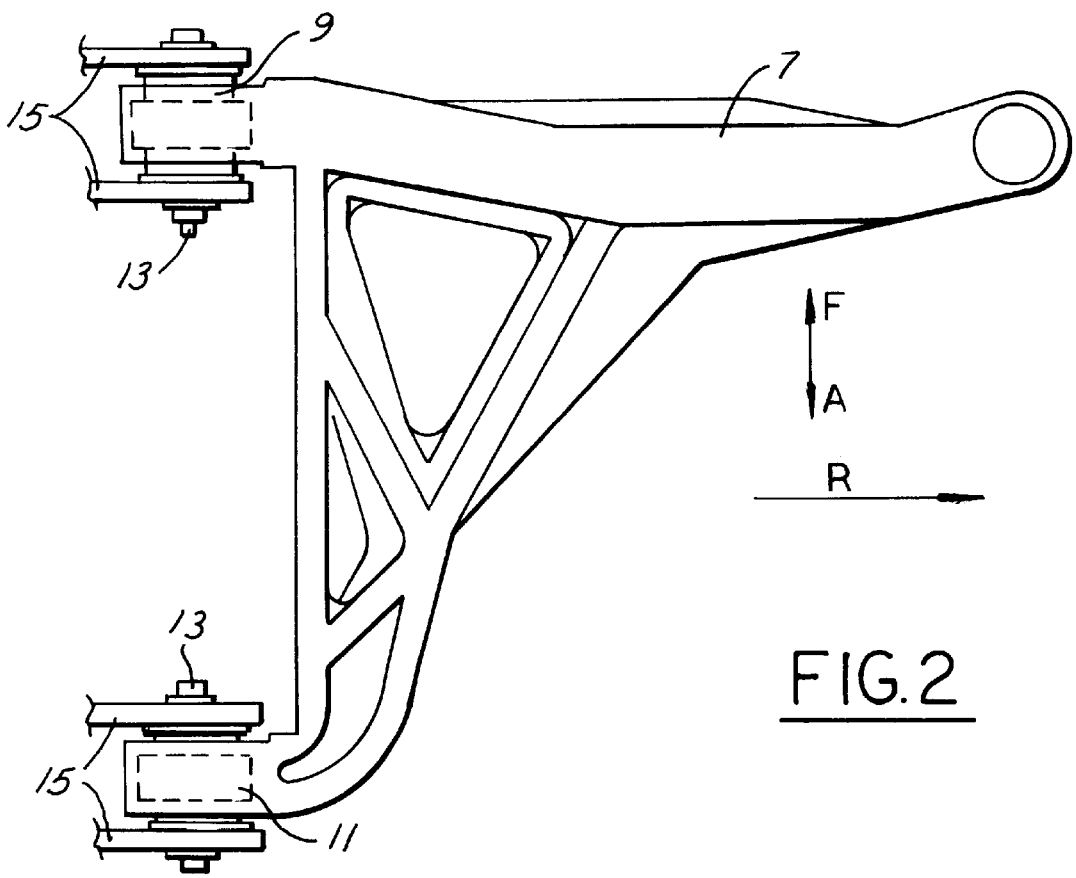
FIG. 2 is an elevated view of a lower control arm including a bushing apparatus constructed in accordance with the present invention.

Referring now to FIGS. 1–2, a partial view of a typical motor vehicle suspension and a lower control arm 11 including a bushing apparatus are shown. Primary functions of a motor vehicle suspension include providing a smooth ride by allowing the wheels to move independently from the body and thus isolating the passengers from road irregularities while controlling a preferred orientation of the wheel and tire to the road to maintain desirable handling behavior. To accomplish this, the bushing apparatus is used to dampen input forces and control displacements in the radial direction, as indicated in FIG. 2, from the wheels. A second function of the suspension includes improving the ride characteristics and isolating the vehicle from NVH, which can be accomplished by controlling the movement of the bushing apparatus in the axial direction, as shown in FIG. 2. Acceleration and deceleration of the motor vehicle impart forces on the bushing apparatus in the axial direction, causing forward and rearward displacement of the bushing apparatus.

Referring now to FIG. 2, the bushing apparatus interconnects the lower control arm 11 to the vehicle body. Typically, an installation bolt 13 extends along the axial center of the control arm and attaches at both ends to brackets 15 mounted to the vehicle body. The lower control arm 11 attaches to the bushing apparatus through a press-fit or a weld.

Figure 3:
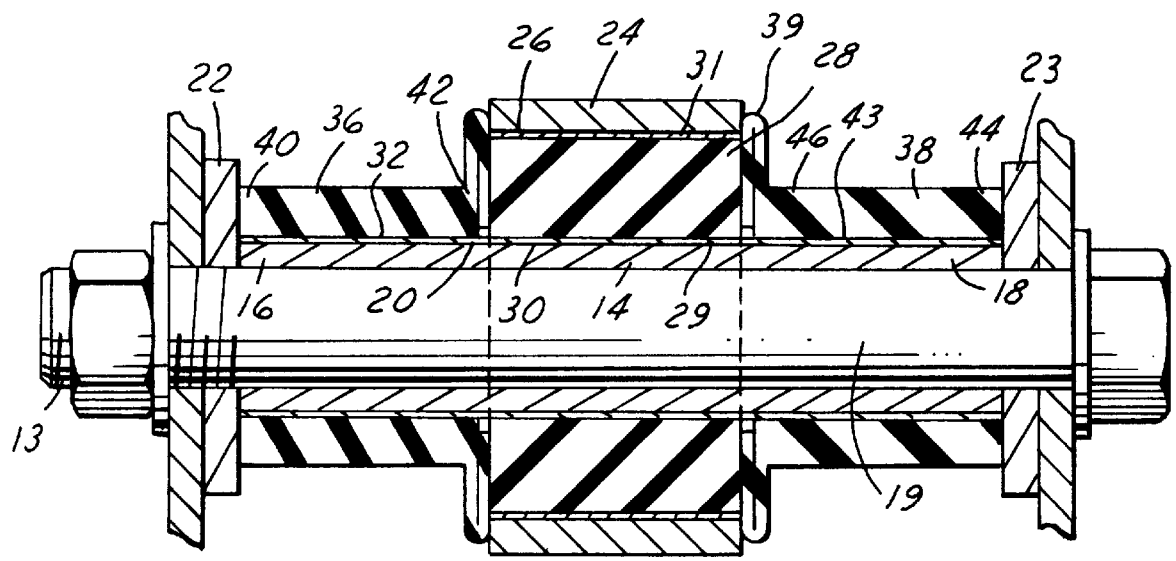
FIGS. 3 and 3A are sectional views of a first preferred embodiment of a bushing apparatus in accordance with the present invention.
Figure 3A:
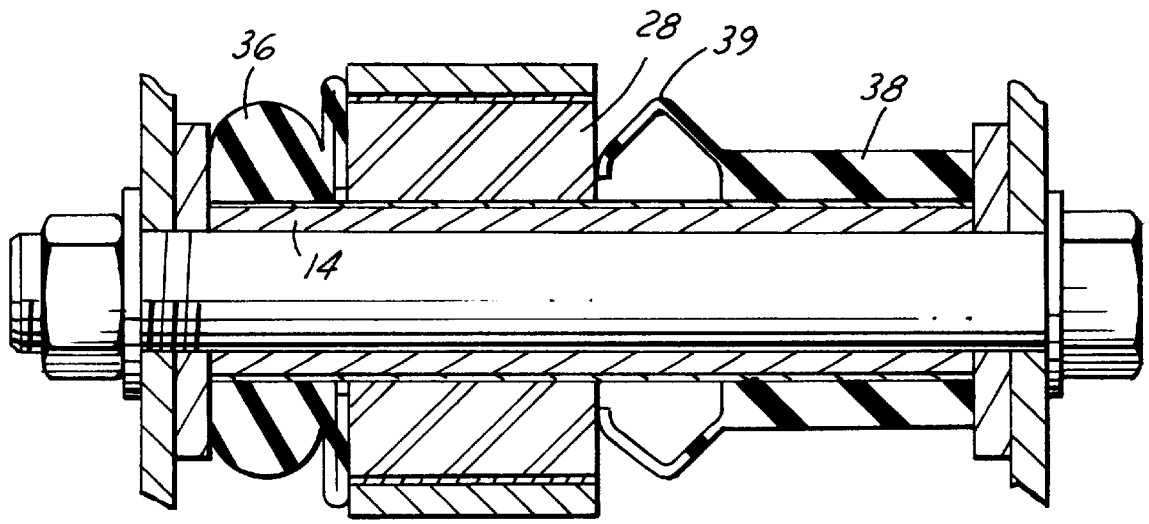

Referring now to FIG. 3, the bushing apparatus includes an inner cylindrical member 14 having first and second ends 16, 18 and a first outer surface 20. To simplify the description, it shall be assumed that the first end 16 is forward of the second end 18 relative to a longitudinal axis of the motor vehicle. First and second stops 22, 23 project radially outward from the first outer surface 20 and are positioned at the first and second ends 16, 18 respectively, of the inner cylindrical member 14. The first and second stops 22, 23 may be formed as out-turned flanges extending from the first outer surface 20, or alternatively, welded-on or press-on washers. An outer cylindrical member 24 includes a first inner surface 26 arranged coaxially with the inner cylindrical member 14. The maximum length of the outer cylindrical member 24 is such that the outer cylindrical member 24 will not contact either the first or second stops 22 when a large axial force is input.

A bearing member 28 includes a second inner surface 29 and a second outer surface 31 and is positioned in an annular space formed between the inner cylindrical member 14 and the outer cylindrical member 24. The second outer surface 31 of the bearing member 28 is bonded or otherwise non-slidably secured to the first inner surface 26 of the outer cylindrical member 24. The bearing member 28 may be composed of an elastomeric material such as natural or synthetic rubber, or any other known materials have similar resilient properties. A friction reducer 30 may be applied to the first outer surface 20 of the inner cylindrical member 14 to further assist relative movement between the first outer surface 20 of the inner cylindrical member 14 and the second inner surface 29 of the bearing member 28. The friction reducer 30 may be a low friction woven fabric cover impregnated with PTFE or may simply comprise a layer of grease. Preferably, the friction reducer 30 extends outwardly from the bearing member 28 between the inner cylindrical member 14 and first and second elastomeric members 36, 38.

The first elastomeric member 36 includes a third inner surface 32 adjacent to the friction reducer 30 on the inner cylindrical member 14. A third end 40 of the first elastomeric member 36 is adjacent to the first stop 22 and a fourth end 42 is adjacent to the bearing member 28. The second elastomeric member 38 includes a fifth end 44 adjacent to the second stop 23 and a sixth end 46 adjacent to the bearing member 28. The third and fourth elastomeric members 36, 38 may be any resilient spring medium. One or both of the first and second elastomeric members 36, 38 are unsecured to the bearing member 28. When unsealed, it may be advantageous to place a seal 39 between the elastomeric member and the bearing member 28 to reduce or prevent the influx of debris from contaminating the slidable interface between the outer surface 20 of the inner cylindrical member 14 and the elastomeric members 36, 38 and the bearing member 28. Depending on the desired performance of the elastomeric members 36, 38, each elastomeric member is made of a different material which may vary in mechanical properties such as stiffness and spring rate, as well as geometric shape.

Figure 4:
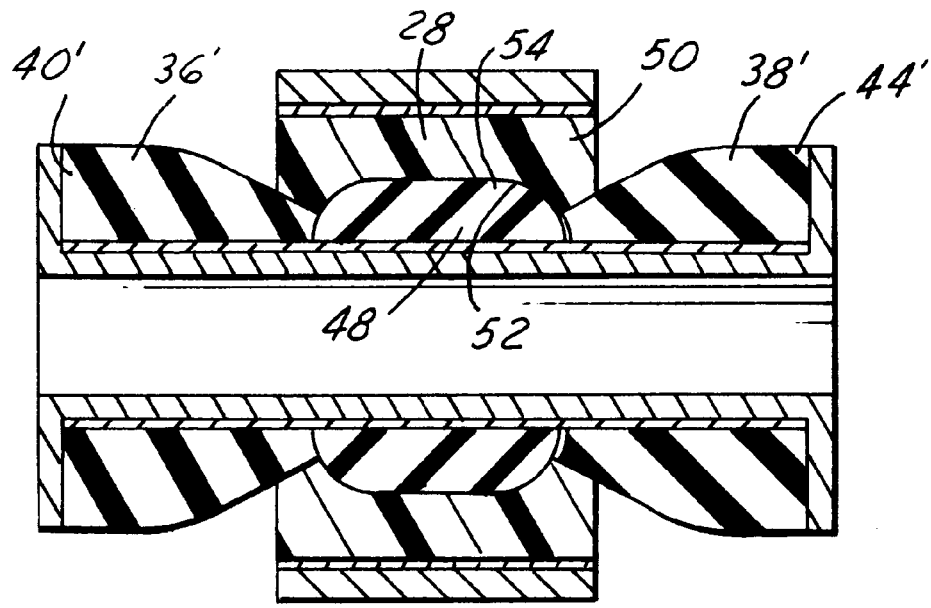
FIG. 4 is sectional view of a second preferred embodiment of a bushing apparatus in accordance with the present invention.

Referring now to FIG. 4, a second embodiment of the bushing apparatus is shown. The bearing member 28' includes inner and outer members 48, 50. The inner member 48 may be made from a rigid material, such as metallic or polymeric material, and includes a convex outer surface 52. The outer member 50 may be made from a resilient material, such as natural or synthetic rubber, and includes a concave inner surface 54 for matingly engaging the convex outer surface 52. The inner member 48 is maintained within the outer member 50 and is free to rotate about an axial centerline of the inner cylindrical member 14. A lubricant may be added between the concave inner surface 54 and the convex outer surface 52 to enhance rotatability. This embodiment also illustrates that the first and second elastomeric members 36', 38' can vary in shape to alter the effective spring rate. For example, the fourth end 40' of the first elastomeric member 36' and the sixth end 44' of the second elastomeric member 38' have conically-shaped outer surfaces so as to provide non-linear spring rates.

Figure 5:
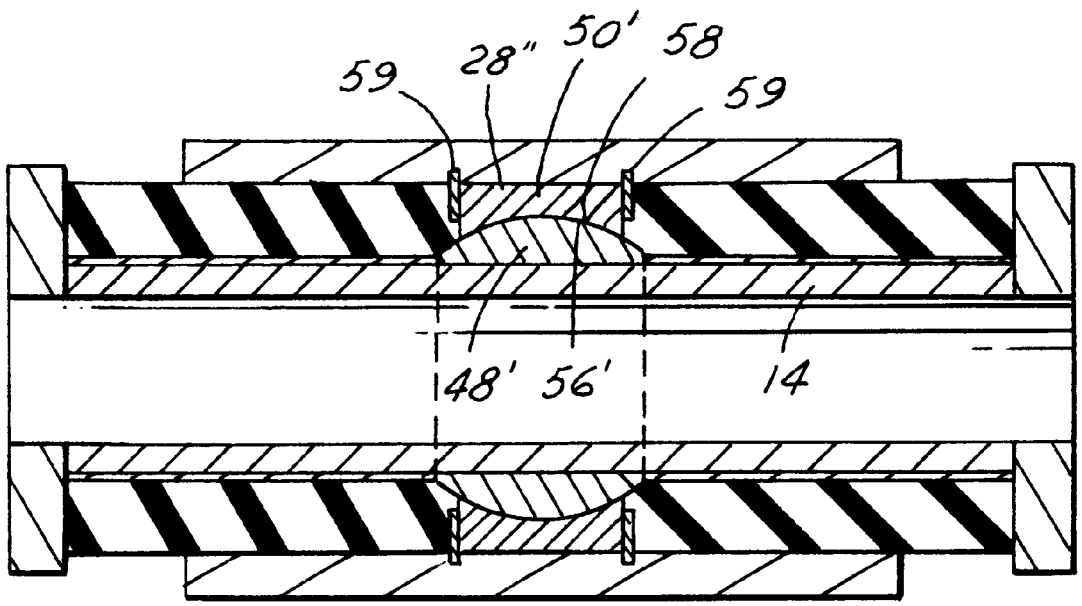
FIG. 5 is sectional view of a third preferred embodiment of a bushing apparatus in accordance with the present invention.

Referring now to FIG. 5, a third embodiment of the bushing apparatus is shown. The bearing member 28" includes inner and outer members 48', 50'. The inner member 48' is made from a rigid material, such as steel, and includes a spherical outer surface 56. The outer member 50' is made from a rigid material, such as steel, and includes a spherical inner surface 58. The inner member 48' is maintained within the outer member 50' and is free to rotate. A lubricant may be added between the spherical inner surface 58 and the spherical outer surface 56 to enhance rotatability.

Referring now to FIGS. 3–5, operation of the present invention will now be described. As the tires of the motor vehicle follow along the road, they transmit forces along the suspension arm to the bushing apparatus. Because the tires are positioned radially outward relative to the bushing apparatus, the forces act radially on the bushing apparatus. It is the function of the bushing apparatus to dampen these radial forces. When forces act upon the bushing apparatus radially, the second outer surface 31 of the bearing member 28 comes into contact with the first inner surface 26 of the outer cylindrical member 24. In the first embodiment in FIG. 3, the bearing member 28 dampens the input force, minimizing radial displacement of the inner cylindrical member 14 and thereby increasing the controllability of the vehicle. Similarly, in the second embodiment in FIG. 4, the outer member 50 of the bearing member 28' comes into contact with the first inner surface 26' of the outer cylindrical member 24' to dampen the input force. In the third embodiment in FIG. 5, the input forces result in no significant displacement of the inner cylindrical member 14' because the inner and outer members 48', 50' of the bearing members 28" are rigid.

During acceleration and braking of the vehicle, the input forces act upon the bushing assembly in the axial direction. All three embodiments respond to axial input forces in a similar manner. When the forces act upon the bushing assembly in the axial direction, the second inner surface 29 of the bearing member 28 slides relative to the first outer surface 20 of the inner cylindrical member 14. Because the third end 40 of the first elastomeric member 36 and the fourth end 44 of the second elastomeric member 38 are not secured to the bearing member 28, as the outer cylindrical member 24 moves axially, only one of the elastomeric members 36, 38 dampens the input forces, depending on the direction of the displacement of the outer cylindrical member 24. For example, during braking, the bearing member 28 moves forward and compresses the first elastomeric member 36 so that only the first elastomeric member 36 absorbs the input force. The elastomeric members 36, 38 cushion the displacement of the outer cylinder 24 to minimize the transmission of road induced vibration to the vehicle occupant, providing for a more comfortable ride in the vehicle. It can be appreciated by those skilled in the art that the bushing apparatus could therefore be designed to have one of the first or second elastomeric members with a low spring rate and the other elastomeric member with a high spring rate, thus allowing for significantly greater displacement in one direction than the opposite.

Finally, during operation the control arm may also impart torsional forces into the bushing assembly. The second and third embodiments include improvements directed to providing greater tunability in response to torsional loading, generally known as the conical rate of the bushing. Referring to FIGS. 4 and 5, the inner and outer members of the bearing member allow the inner cylindrical member to move in a rocking manner about a centerline perpendicular to the axial direction with varying degrees of friction and resilience.

The foregoing description presents three preferred embodiments of the present invention. Details of construction have been shown and described for purposes of illustration rather than limitation. For instance, it should be apparent to those skilled in the art that it may be advantageous to axially preload one of the first or second elastomeric members so as to control the initial displacement of the bushing in the axial direction. Other modifications and alterations of the invention will no doubt occur to those skilled in the art that will come within the scope and spirit of the following claims.

We claim:

1. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

a first elastomeric member disposed coaxially with said inner cylindrical member and including third and fourth ends and a third inner surface, said third end adjacent to said first stop and said fourth end adjacent to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, wherein said first and second elastomeric members possess different spring rates.

2. The bushing apparatus according to claim 1, wherein both of said first and second elastomeric members are unsecured to said bearing member.

3. The bushing apparatus according to claim 1, further comprises a friction reducer disposed coaxially between said first outer surface of said inner cylindrical member and said second inner surface of said bearing member.

4. The bushing apparatus according to claim 1, wherein said second outer surface of said bearing member is non-slidably secured to said first inner surface of said outer cylindrical member.

5. The bushing apparatus according to claim 1, wherein said bearing member further comprises:
    an inner member made from a rigid material and including a convex outer surface;
    an outer member made from a resilient material and including a concave inner surface;
    said inner member is rotatably disposed within said outer member.

6. The bushing apparatus according to claim 1, wherein said bearing member further comprises:
    an inner member made from a rigid material and including a spherical outer surface;
    an outer member made from a rigid material and including a spherical inner surface;
    said inner member is rotatably disposed within said outer member.

7. A bushing apparatus for interconnecting two members and allowing relative motion therebetween as found in motor vehicle suspensions, said bushing apparatus comprising:
    an inner cylindrical member including a first outer surface and first and second ends;
    first and second stops disposed on said first and second ends, respectively, and projecting radially outward from said first outer surface of said inner cylindrical member;
    an outer cylindrical member arranged coaxially with said inner cylindrical member and including a first inner surface;
    a bearing member interposed coaxially between said inner and outer cylindrical members and including a second inner surface and a second outer surface, said second inner surface being cylindrical and slidable relative to said first outer surface of said inner cylindrical member;
    a first elastomeric member disposed coaxially with said inner cylindrical member and including third and fourth ends and a third inner surface, said third end adjacent to said first stop and said fourth end adjacent to said bearing member;
    a second elastomeric member disposed coaxially with said inner cylindrical member and including fifth and sixth ends and a fourth inner surface, said fifth end being adjacent to said second stop and said sixth end being adjacent to said bearing member;
    at least one of said first and second elastomeric members is unsecured to said bearing member, wherein said fourth and sixth ends of said first and second elastomeric members have conically-shaped outer surfaces so at to provide nonlinear spring rates.

8. A bushing apparatus for interconnecting two members and allowing relative motion therebetween as found in motor vehicle suspensions, said bushing apparatus comprising:
    an inner cylindrical member including a first outer surface and first and second ends;
    first and second stops disposed on said first and second ends, respectively, and projecting radially outward from said first outer surface of said inner cylindrical member;
    an outer cylindrical member arranged coaxially with said inner cylindrical member and including a first inner surface;
    a bearing member interposed coaxially between said inner and outer cylindrical members and including a second inner surface and a second outer surface, said second inner surface being cylindrical and slidable relative to said first outer surface of said inner cylindrical member;
    a first elastomeric member disposed coaxially with said inner cylindrical member and including third and fourth ends and a third inner surface, said third end adjacent to said first stop and said fourth end adjacent to said bearing member;
    a second elastomeric member disposed coaxially with said inner cylindrical member and including fifth and sixth ends and a fourth inner surface, said fifth end being adjacent to said second stop and said sixth end being adjacent to said bearing member;
    at least one of said first and second elastomeric members is unsecured to said bearing member,
    a friction reducer extending between said third inner surface of said first elastomeric member and said first outer surface of said inner cylindrical member, and between said fourth inner surface of said second elastomeric member and said first outer surface of said inner cylindrical member.

9. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a convex outer surface;

said outer member is made from a resilient material and includes a concave inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, wherein said first and second elastomeric members possess different spring rates.

10. The bushing apparatus according to claim 9, further comprises a friction reducer disposed coaxially between said first outer surface of said inner cylindrical member and said second inner surface of said bearing member.

11. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a convex outer surface;

said outer member is made from a resilient material and includes a concave inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, wherein said third and fifth ends of said first and second elastomeric members have conically-shaped outer surfaces so at to provide nonlinear spring rates.

12. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a convex outer surface;

said outer member is made from a resilient material and includes a concave inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, and a friction reducer extending between said third inner surface of said first elastomeric member and said first outer surface of said inner cylindrical member, and between said fourth inner surface of said second elastomeric member and said first outer surface of said inner cylindrical member.

13. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a convex outer surface;

said outer member is made from a resilient material and includes a concave inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, wherein said second outer surface of said bearing member is non-slidably secured to said first inner surface of said outer cylindrical member.

14. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a spherical outer surface;

said outer member is made from a rigid material and includes a spherical inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, wherein said first and second elastomeric members possess different spring rates.

15. The bushing apparatus according to claim 14, further comprises a friction reducer disposed coaxially between said first outer surface of said inner cylindrical member and said second inner surface of said bearing member.

16. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a spherical outer surface;

said outer member is made from a rigid material and includes a spherical inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, wherein said third and fifth ends of said first and second elastomeric members have conically-shaped outer surfaces so at to provide nonlinear spring rates.

17. A bushing apparatus for interconnecting two members and allowing relative motion therebetween as found in motor vehicle suspensions, said bushing apparatus comprising:

an inner cylindrical member including a first outer surface and first and second ends;

first and second stops disposed on said first and second ends, respectively, and projecting radially outward from said first outer surface of said inner cylindrical member;

an outer cylindrical member arranged coaxially with said inner cylindrical member and including a first inner surface;

a bearing member interposed coaxially between said inner and outer cylindrical members and including a second inner surface and a second outer surface, said second inner surface being cylindrical and slidable relative to said first outer surface of said inner cylindrical member;

said bearing member comprises inner and outer members, said inner member is rotatably disposed within said outer member;

said inner member is made from a rigid material and includes a spherical outer surface;

said outer member is made from a rigid material and includes a spherical inner surface;

a first elastomeric member disposed coaxially with said inner cylindrical member and including third and fourth ends and a third inner surface, said third end adjacent to said first stop and said fourth end adjacent and unsecured to said bearing member;

a second elastomeric member disposed coaxially with said inner cylindrical member and including fifth and sixth ends and a fourth inner surface, said fifth end being adjacent to said second stop and said sixth end being adjacent to said bearing member;

at least one of said first and second elastomeric members is unsecured to said bearing member, and a friction reducer extending between said third inner surface of said first elastomeric member and said first outer surface of said inner cylindrical member, and between said fourth inner surface of said second elastomeric member and said first outer surface of said inner cylindrical member.

* * * * *